US008467894B2

(12) United States Patent
Santos et al.

(10) Patent No.: US 8,467,894 B2
(45) Date of Patent: Jun. 18, 2013

(54) METHOD AND APPARATUS FOR MANAGING PRODUCT END OF LIFE

(75) Inventors: Cipriano A. Santos, Mountain View, CA (US); Fereydoon Safai, Los Altos Hills, CA (US); Dirk Beyer, Mountain View, CA (US); Shailendra Jain, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4101 days.

(21) Appl. No.: 09/756,337

(22) Filed: Jan. 6, 2001

(65) Prior Publication Data

US 2002/0143665 A1 Oct. 3, 2002

(51) Int. Cl.
*G06F 19/00* (2011.01)

(52) U.S. Cl.
USPC ............................ 700/100; 705/7.31; 705/28

(58) Field of Classification Search
USPC ................ 700/103, 100; 706/19; 705/7, 7.31, 705/28, 29
See application file for complete search history.

(56) References Cited

U.S. PATENT DOCUMENTS 5,128,861 A * 7/1992 Kagami et al. .................. 705/10
5,185,715 A * 2/1993 Zikan et al. .................... 708/801
5,224,034 A * 6/1993 Katz et al. .......................... 705/7
5,287,267 A * 2/1994 Jayaraman et al. ............. 705/10
5,311,438 A * 5/1994 Sellers et al. ................... 700/96
5,615,109 A * 3/1997 Eder ................................. 705/8
5,787,283 A * 7/1998 Chin et al. .................... 717/101
5,841,659 A * 11/1998 Tanaka et al. ................. 700/121
5,903,457 A * 5/1999 Chang ............................. 700/95
5,970,465 A * 10/1999 Dietrich et al. .................... 705/7
6,006,192 A * 12/1999 Cheng et al. ....................... 705/7
6,119,100 A * 9/2000 Walker et al. ................... 705/20
6,226,561 B1 * 5/2001 Tamaki et al. ................ 700/100
6,978,249 B1 * 12/2005 Beyer et al. ...................... 705/10
6,988,076 B2 * 1/2006 Ouimet ............................. 705/7
7,080,026 B2 * 7/2006 Singh et al. ...................... 705/10
2002/0072956 A1 * 6/2002 Willems et al. ................. 705/10
2005/0131779 A1 * 6/2005 Kitamura et al. ............... 705/29

OTHER PUBLICATIONS

Jain, Anuj K; Aparicio, Manuel IV; Singh, Nunindar P. Agents for process coherence in virtual enterprises. Communication of the ACM v42n3, pp. 62-69. Mar. 1999 from dialog file 15, 01784417.*
Gupta, Saurabh; Krishnan V. Product family-based assembly sequence design methodology. IIE Transactions, 30, 10, 933. Oct. 1998. from dialog, file 148, 12139363.*
Lyons, Daniel. Practical Genius. Back to Back on the Chain Gang. Oct. 13, 2003. www.forbes.com/forbes/2003/1013/114sidebar_print.html.*
Compaq announces record sales and operating profits 1995 sales of $14.8 billion lift Compaq to No. 5 computer company in the world. News Release. Jan. 24, 1996. from dialog file 16: 4169018.*

* cited by examiner

*Primary Examiner* — Dave Robertson

(57) ABSTRACT

A method of managing product end of life over an end of life horizon includes the step of selecting an objective of either maximizing gross profit or minimizing writeoff costs for a selected plurality of products being discontinued. The products may have parts in common. A subset of all possible combinations of product demand levels is selected. Each combination is associated with a probability. A procurement plan that optimizes the selected objective is generated based on the selected subset of demand levels given a non-zero pre-existing inventory of at least some parts of the selected products.

21 Claims, 12 Drawing Sheets

700

| METRIC | DESCRIPTION |
|---|---|
| AFTER/BEFORE INVENTORY EXPOSURE RATIO | $\frac{\sum_{i \in Unique\ Parts} Cost_i \cdot WriteOff_i}{\sum_{i \in Unique\ Parts} Cost_i \cdot Inv_i}$ |
| INVENTORY EXPOSURE | $\sum_{i \in Unique\ Parts} Cost_i \cdot Inv_i$ |
| WRITEOFF VALUE | $\sum_{i \in Unique\ Parts} Cost_i \cdot WriteOff_i$ |
| PROCUREMENT INVESTMENT | $\sum_{i \in Unique\ Raw\ Materials} Cost_i \cdot BuyQty_i$ |
| BUDGET SHADOW PRICE | CALCULATED BY EOL ENGINE |
| BUDGET | DOLLAR LIMIT SET BY USER |
| REVENUE | $\sum_{i \in Products} Price_i \cdot SellQty_i$ |
| POTENTIAL LOSS DUE TO INVENTORY EXPOSURE | $(1 - Salvage) \cdot \sum_{i \in Unique\ Parts} Cost_i \cdot Inv_i$ |
| WRITEOFF SALVAGE VALUE | $Salvage \cdot \sum_{i \in Unique\ Parts} Cost_i \cdot WriteOff_i$ |
| OBJ: MINIMIZE WRITEOFF COST (MINIMIZE λ) | $\lambda = \left[(1 - Salvage) \cdot \sum_{i \in Unique\ Parts} Cost_i \cdot WriteOff_i\right]$ |
| OBJ: MAXIMIZE GROSS PROFIT (MAXIMIZE λ) | $\lambda = \left[\sum_{i \in Products} Price_i \cdot SellQty_i - \sum_{i \in Parts} Cost_i \cdot Inv_i + \sum_{i \in NonUnique\ Parts} Cost_i \cdot WriteOff_i + Salvage \cdot \sum_{i \in Unique\ Parts} Cost_i \cdot WriteOff_i - \sum_{i \in Raw\ Materials} Cost_i \cdot BuyQty_i\right]$ |
| OBJECTIVE FUNCTION FLAG | SET BY USER |
| UNIQUE FLAG | SET BY USER |
| SALVAGE | SET BY USER |
| NUMBER OF PRODUCTS | COUNT OF DISCONTINUED PRODUCTS |
| NUMBER OF ASSEMBLIES | COUNT OF DISTINCT ASSEMBLIES |
| NUMBER OF RAW MATERIALS | COUNT OF DISTINCT RAW MATERIALS |

310

| DATA CHECKER INPUT FILES | DATA CHECKER OUTPUT/ EOL ENGINE INPUT FILES |
| --- | --- |
| PRODUCT.TXT | PRODUCT.EOL |
| BOM.TXT | BOM.EOL<br>ASSEMBLY.EOL<br>RAW.EOL |
| STDCOST.TXT | STDCOST.EOL |
| FORECAST.TXT | FORECAST.EOL |
| INVENTORY.TXT<br>OPENPO.TXT<br>RESELLER.TXT<br>CMINVT.TXT<br>CMOPENPO.TXT | INVENTORY.EOL |
| UNIQUE.TXT | UNIQUE.EOL |
| PRICE.TXT | PRICE.EOL |
| LIMIT.TXT | LIMIT.EOL |
| CONFIG.TXT | CONFIG.EOL |

320

| EOL ENGINE OUTPUT FILE |
| --- |
| SELL.EOL |
| MAKE.EOL |
| BUY.EOL |
| WRITEOFF.EOL |
| SHDBUDGET.EOL |
| SHDRAW.EOL |
| SHDPROD.EOL |

FIG. 3

PRODUCT.TXT -> | SITE | PRODUCT ID | ~410

BOM.TXT -> | SITE | PARENT PART ID | CHILD PART ID | QUANTITY | ~412

STDCOST.TXT -> | PART ID | STD COST | DESC | ~420

FORECAST.TXT -> | SITE | PRODUCT ID | MONTH | QUANTITY | ~430

INVENTORY.TXT
CMINVT.TXT
OPENPO.TXT
CMOPENPO.TXT -> | SITE | PART ID | QUANTITY | REF DATE | ~440

RESELLER.TXT -> | PART ID | QUANTITY | REF DATE | ~450

UNIQUE.TXT -> | PART ID | ~460

PRICE.TXT -> | SITE | PRODUCT ID | MONTH | PRICE | ~470

LIMIT.TXT -> | SITE | PART ID | LIMIT QUANTITY | ~480

490

CONFIG.TXT -> | SALVAGE | BUDGET | UNIQUE FLAG | OBJECTIVE FUNCTION FLAG |

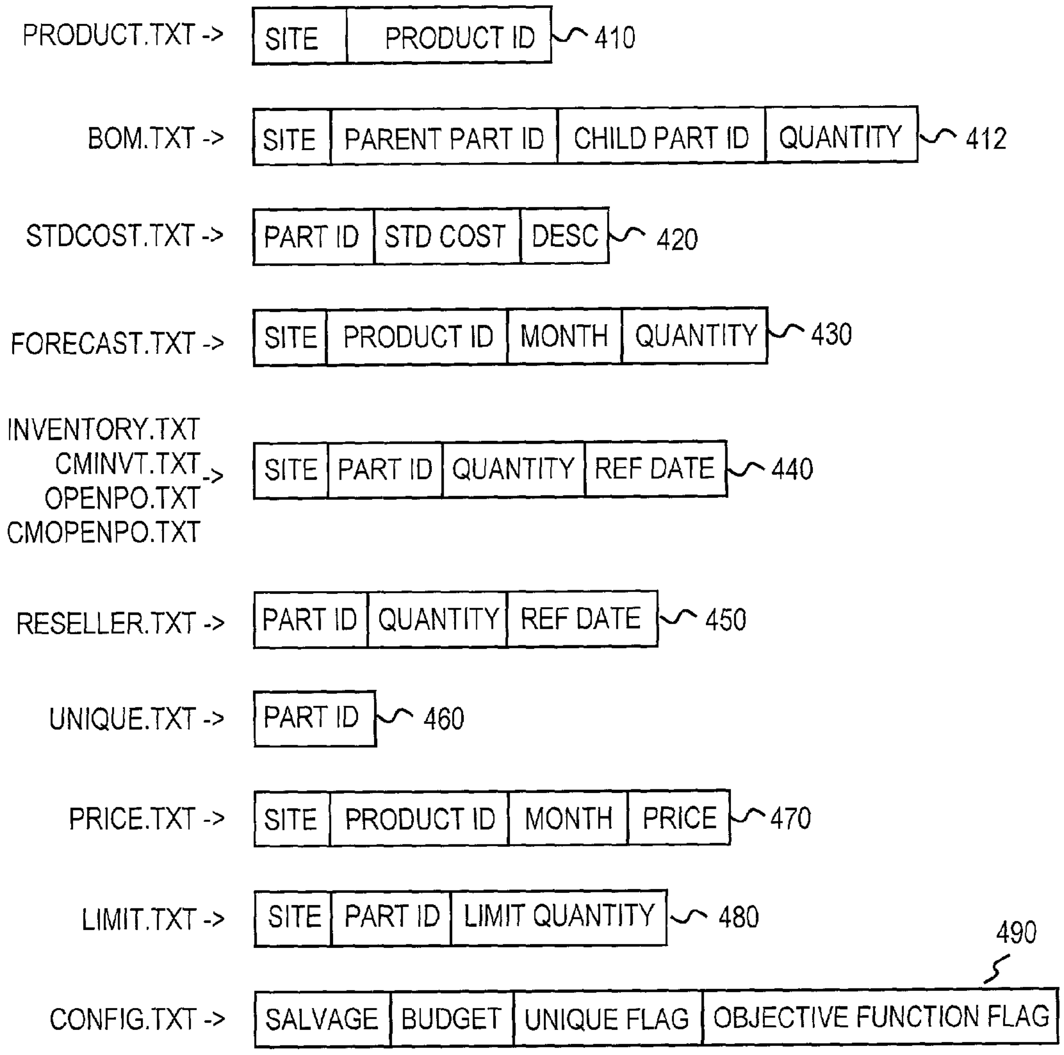

FIG. 4

PRODUCT.EOL -> | PRODUCT ID | ~510

BOM.EOL -> | PARENT PART ID | CHILD PART ID | QUANTITY | ~512

STDCOST.EOL -> | PART ID | STD COST | ~520

FORECAST.EOL -> | PRODUCT ID | QUANTITY | ~530

INVENTORY.EOL -> | PART ID | QUANTITY | ~540

UNIQUE.EOL
ASSEMBLY.EOL -> | PART ID | ~560
RAW.EOL

PRICE.EOL -> | PRODUCT ID | PRICE | ~570

LIMIT.EOL -> | PART ID | LIMIT QUANTITY | ~580

590

CONFIG.EOL -> | SALVAGE | BUDGET | UNIQUE FLAG | OBJECTIVE FUNCTION FLAG |

700

| METRIC | DESCRIPTION |
|---|---|
| AFTER/BEFORE INVENTORY EXPOSURE RATIO | $\dfrac{\sum_{i \in Unique\ Parts} Cost_i \bullet WriteOff_i}{\sum_{i \in Unique\ Parts} Cost_i \bullet Inv_i}$ |
| INVENTORY EXPOSURE | $\sum_{i \in Unique\ Parts} Cost_i \bullet Inv_i$ |
| WRITEOFF VALUE | $\sum_{i \in Unique\ Parts} Cost_i \bullet WriteOff_i$ |
| PROCUREMENT INVESTMENT | $\sum_{i \in Unique\ Raw\ Materials} Cost_i \bullet BuyQty_i$ |
| BUDGET SHADOW PRICE | CALCULATED BY EOL ENGINE |
| BUDGET | DOLLAR LIMIT SET BY USER |
| REVENUE | $\sum_{i \in Products} Price_i \bullet SellQty_i$ |
| POTENTIAL LOSS DUE TO INVENTORY EXPOSURE | $(1 - Salvage) \bullet \sum_{i \in Unique\ Parts} Cost_i \bullet Inv_i$ |
| WRITEOFF SALVAGE VALUE | $Salvage \bullet \sum_{i \in Unique\ Parts} Cost_i \bullet WriteOff_i$ |
| OBJ: MINIMIZE WRITEOFF COST (MINIMIZE $\lambda$) | $\lambda = \left[ (1 - Salvage) \bullet \sum_{i \in Unique\ Parts} Cost_i \bullet WriteOff_i \right]$ |
| OBJ: MAXIMIZE GROSS PROFIT (MAXIMIZE $\lambda$) | $\lambda = \left[ \begin{array}{l} \sum_{i \in Products} Price_i \bullet SellQty_i - \sum_{i \in Parts} Cost_i \bullet Inv_i + \sum_{i \in NonUnique\ Parts} Cost_i \bullet WriteOff_i \\ + Salvage \bullet \sum_{i \in Unique\ Parts} Cost_i \bullet WriteOff_i - \sum_{i \in Raw\ Materials} Cost_i \bullet BuyQty_i \end{array} \right]$ |
| OBJECTIVE FUNCTION FLAG | SET BY USER |
| UNIQUE FLAG | SET BY USER |
| SALVAGE | SET BY USER |
| NUMBER OF PRODUCTS | COUNT OF DISCONTINUED PRODUCTS |
| NUMBER OF ASSEMBLIES | COUNT OF DISTINCT ASSEMBLIES |
| NUMBER OF RAW MATERIALS | COUNT OF DISTINCT RAW MATERIALS |

DISCONTINUED PRODUCT
EOL SELL REPORT JOB #3353

| PRODUCT ID (810) | SELL QTY (820) | SELLING PRICE (830) | FORECAST (840) | PRODUCT SHADOW PRICE (850) | REVENUE (860) |
|---|---|---|---|---|---|
| D8544A | 6 | 7,610.13 | 6 | 121.92 | 45,661 |
| D82561 | 3 | 6,923.81 | 3 | 121.92 | 20,771 |
| D8546A | 1 | 9,927.78 | 1 | 121.92 | 9,928 |
| D6028A | 8 | 506.25 | 196 | 0.00 | 4050 |
| D6021A | 0 | 8,376.46 | 0 | 0.00 | 0 |
| D6022A | 0 | 9,825.14 | 0 | 0.00 | 0 |

DISCONTINUED PRODUCT
EOL MAKE REPORT JOB #3353

| PART ID (910) | DESCRIPTION (920) | MAKE QTY (930) | STD COST (940) | INV (950) | WRITEOFF QTY (960) | WRITEOFF VALUE (970) | WRITEOFF LOSS EXPOSURE (980) |
|---|---|---|---|---|---|---|---|
| 5064-7927 | RACK INSTALL | 0 | 12.25 | 205 | 205 | 2,510.41 | 1,631.77 |
| D6121-80202 | LABEL 450/1M | 0 | 0.04 | 1000 | 1000 | 44.50 | 28.93 |
| D7001-80200 | LABEL 450/512K | 0 | 0.04 | 1000 | 1000 | 44.50 | 28.93 |
| D7007-80200 | LABEL 400/512K | 0 | 0.04 | 1000 | 1000 | 44.50 | 28.93 |
| 5064-7010 | . | 2 | 440.10 | 0 | 0 | 0.00 | 0.00 |
| 5065-0102 | . | 0 | 14.42 | 10 | 0 | 0.00 | 0.00 |
| D6021-60002 | . | 2 | 104.65 | 0 | 0 | 0.00 | 0.00 |
| D6021-60160 | . | 2 | 4,061.84 | 8 | 0 | 0.00 | 0.00 |

DISCONTINUED PRODUCT
EOL BUY REPORT JOB #3353

| PART ID (1010) | DESCRIPTION (1020) | BUY QTY (1030) | STD COST (1040) | BUY DOLLAR (1050) | LIMIT QTY (1060) | SHADOW PRICE (1070) | INV (1080) | WRITEOFF QTY (1090) | WRITEOFF VALUE (1092) |
|---|---|---|---|---|---|---|---|---|---|
| 1821-4199 | - | 0 | 1,850.00 | 0.00 | 0 | 0.00 | 253 | 253 | 468,050.00 |
| 5064-6140 | RACK INSTALL | 0 | 63.95 | 0.00 | 0 | 0.00 | 2,280 | 1,945 | 124,382.75 |
| 1821-4280 | - | 0 | 3,450.00 | 0.00 | 0 | 0.00 | 36 | 36 | 124,200.00 |
| 8120-6884 | 16 AMP CABLE | 0 | 11.80 | 0.00 | 0 | 0.00 | 5,727 | 5,392 | 63,625.60 |
| 5183-7632 | - | 0 | 7.12 | 0.00 | 0 | 0.00 | 5,656 | 5,321 | 37,885.52 |
| 5183-7631 | BOX ENT2 | 100 | 9.89 | 989.00 | 0 | 0.00 | 3,100 | 0 | 0.00 |
| 1821-4198 | - | 0 | 770.00 | 0.00 | 0 | 0.00 | 33 | 33 | 25,410.00 |
| D6028-90001 | MNL-RMC USER | 10 | 5.80 | 58.00 | 10 | 7.53 | 5 | 0 | 0.00 |

FIG. 10

METHOD AND APPARATUS FOR MANAGING PRODUCT END OF LIFE

FIELD OF THE INVENTION

This invention relates to the field of product end of life planning. In particular, this invention is drawn to methods of managing the termination of a product lifecycle.

BACKGROUND OF THE INVENTION

Manufacturers have few choices regarding inventory related to a product being discontinued. Excess materials may be scrapped or written off. Alternatively, additional product may be built ("build out") in order to further reduce inventory for the product being obsolesced. The first choice frequently results in recovering a fraction of the cost of the materials. The second choice could result in additional profits but there is greater exposure in procurement of materials especially unique materials needed to complete the product for sale.

One method of analyzing the tradeoffs between scrapping or building out is referred to as Match Set Analysis. This typically entails "exploding" each product forecast demand while computing consumption of excess inventory and ending inventory. Match Set Analysis does not consider limitations on part availability or procurement budgets. Business objectives such as minimization of write-off costs or maximization of gross profits are not explicitly considered. Moreover, Match Set Analysis does not consider demand uncertainty and thus ignores a risk factor for acquisition of unique parts.

SUMMARY OF THE INVENTION

In view of limitations of known systems and methods, various apparatus and methods are provided for generating a manufacturing plan for products being discontinued.

One method for managing product end of life over an end of life horizon includes the step of selecting at least one product to be discontinued. A business objective of either maximizing gross profit or minimizing writeoff costs for the product being discontinued is selected. A manufacturing plan is generated to optimize the selected objective given a non-zero pre-existing inventory of the at least one part.

Another method includes the step of selecting an objective of either maximizing gross profit or minimizing writeoff costs for a selected plurality of products. A subset of all possible combinations of product demand levels is selected. Each combination is associated with a probability. A procurement plan that optimizes the selected objective is generated. The procurement plan is generated based on the selected subset of demand levels given a non-zero pre-existing inventory of at least some parts of the selected products.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 3 identifies input/output data for the end of life (EOL) optimization apparatus.

FIG. 4 illustrates one embodiment of record layouts for the data checker input files.

FIG. 7 illustrates various metrics provided to or calculated by the EOL engine.

FIG. 8 illustrates one embodiment of a sell report generated by the report generator.

FIG. 9 illustrates one embodiment of a buy report generated by the report generator.

FIG. 10 illustrates one embodiment of a make report generated by the report generator.

DETAILED DESCRIPTION

Methods of determining an optimal product mix to sell and build and procurement plans for the end of a product lifecycle are described. The optimal product mix is computed based on part availability and cost, product demand forecast and uncertainty, procurement budgets. The decision can be optimized for minimization of writeoff costs or maximization of gross profits.

Figure 1:
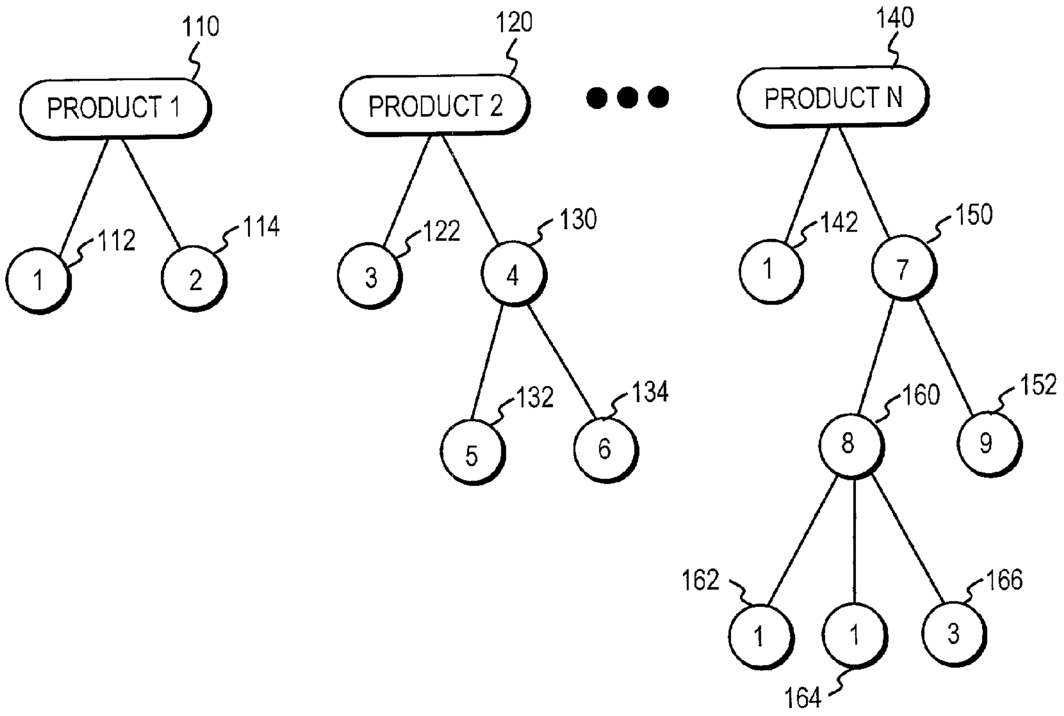
FIG. 1 illustrates composition of products from parts and assemblies.

FIG. 1 illustrates a plurality of products 110, 120, and 140. Each product is composed of a combination of parts and assemblies. The relationships between a given product and the parts or assemblies that make the product are illustrated in a hierarchical tree form where each node identifies a part or assembly.

If a given node (e.g., 122) is not further composed of other parts (i.e., no child nodes), the node is an elementary part or raw material. Product 1, for example, is composed of part 1 112 and part 2 114. Parts 112 and 114 have no children so they are raw materials.

If a given node (e.g., 130) is composed of other parts or assemblies (i.e., at least one child node), then the node corresponds to an assembly. Thus product 2 (120) is composed of parts 3, 4, 5, and 6 (i.e., 122, 130, 132, and 134). Parts 3, 5, and 6 (i.e., 122, 132, and 134) are raw materials. Part 4 is an assembly composed of raw material parts 5 and 6 (i.e., 132 and 134).

Generally, an assembly may be composed of any number of other assemblies or parts. A given part (e.g., part 1) can be used in more than one product. More than one of the same part can be used to build a given assembly (e.g., 160). One of the few restrictions imposed on defining the product is that a part or assembly can not be recursively defined. For clarity, the term "part" is generically used to any item in the bill of materials. In this context, a product is a "part" that has no parent parts. An assembly is a part that has parent and children parts. A raw material is a part that has no children parts. Thus raw materials and assemblies are subsets of the set of parts (i.e., Raw Materials $\subset$ Parts, Assemblies $\subset$ Parts).

Demand forecasting is performed before manufacturing a new product. Although linear programming techniques may be used to maximize profits at the outset of manufacture, errors in demand forecasting for products tend to result in non-optimal manufacturing conditions. For products with relatively long manufacturing lives, errors in demand and subsequent modifications to parts inventory planning may be made over time.

Products with short manufacturing lives are at a greater risk of demand forecasting error. Mistakes are not easily accommodated in a subsequent forecasting period. Excess inventory cannot simply be carried forward into a new forecasting period because the product's short manufacturing life precludes such options. Moreover, asymmetry in the acquisition cost of parts or assemblies versus salvageable value ensures that writeoff losses will be incurred if the inventory of parts is non-zero at the end of a given forecasting period.

Short manufacturing lives (e.g., 24 months or less) are very common with computers, computer peripherals, and many other lines of consumer products. Although end of life planning is useful for short or long lived manufacturing terms, short term projects may experience greater benefit because any losses otherwise incurred cannot be spread over longer time periods as is the case with longer lived manufacturing terms.

Figure 2:
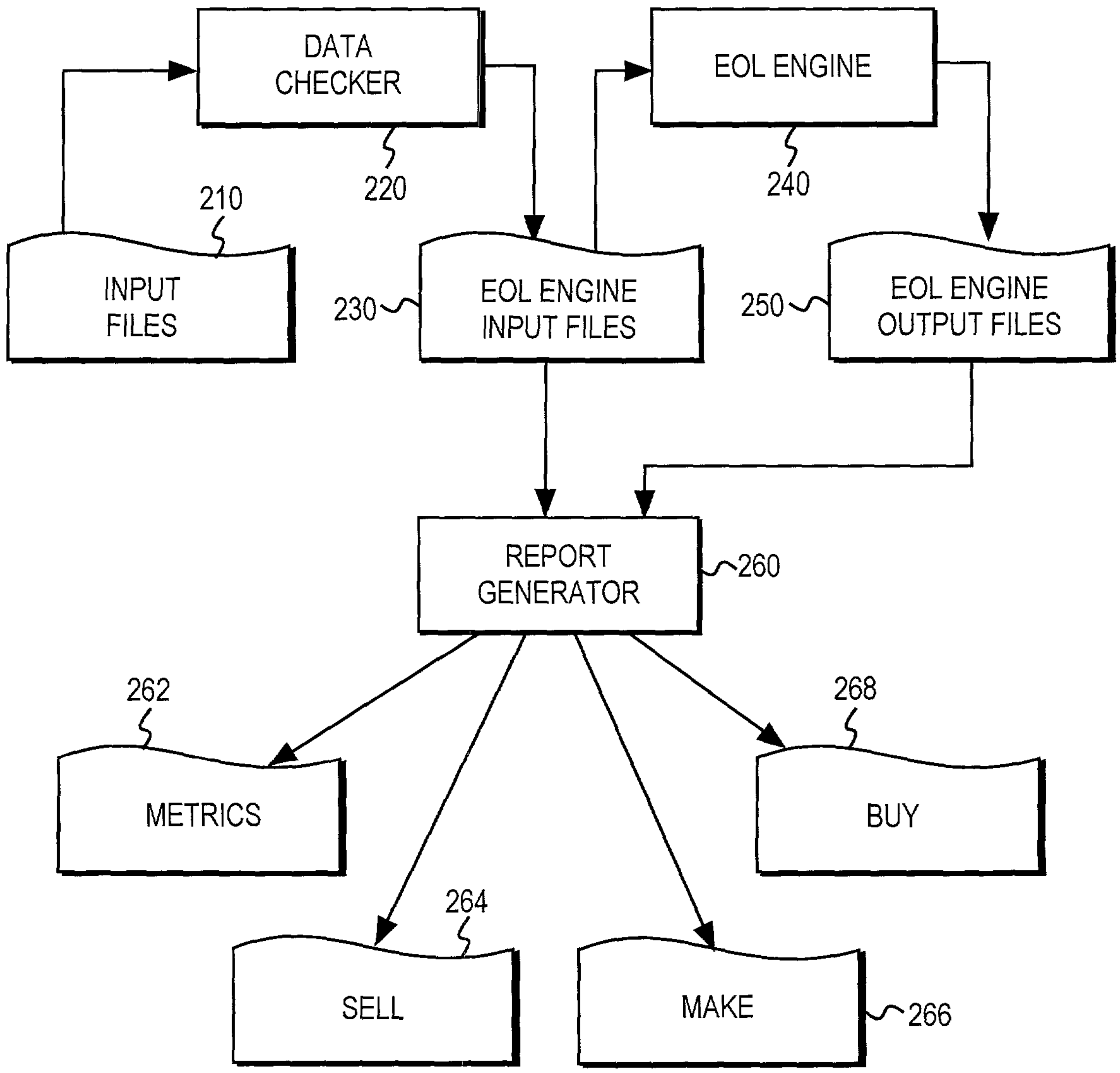
FIG. 2 illustrates a product end of life optimization apparatus.

FIG. 2 illustrates an end of life (EOL) planning tool for managing the end of life of one or more products being phased out. In particular the apparatus of FIG. 2 generates sell, make, and buy (i.e., procurement) plans designed to either maximize gross profit or minimize inventory writeoff.

The EOL planning tool includes a data checker 220, an EOL engine 240, and a report generator 260. In one embodiment, these elements are implemented in software modules executing on one or more processors.

The data checker 220 generates validated EOL engine input files 230 from data checker input files 210. For examples, data checker 220 identifies recursively defined parts in any bill of material files. The output files 230 generated by data checker serve as input data files for the EOL engine 240.

FIG. 3 illustrates an exemplary listing 310 of data checker input and output files and a listing 320 of the EOL engine output files. The data checker input files are provided with the "TXT" name extension. The data checker output files (i.e., EOL engine input files) and EOL engine output files are provided with the "EOL" name extension.

Figure 5:
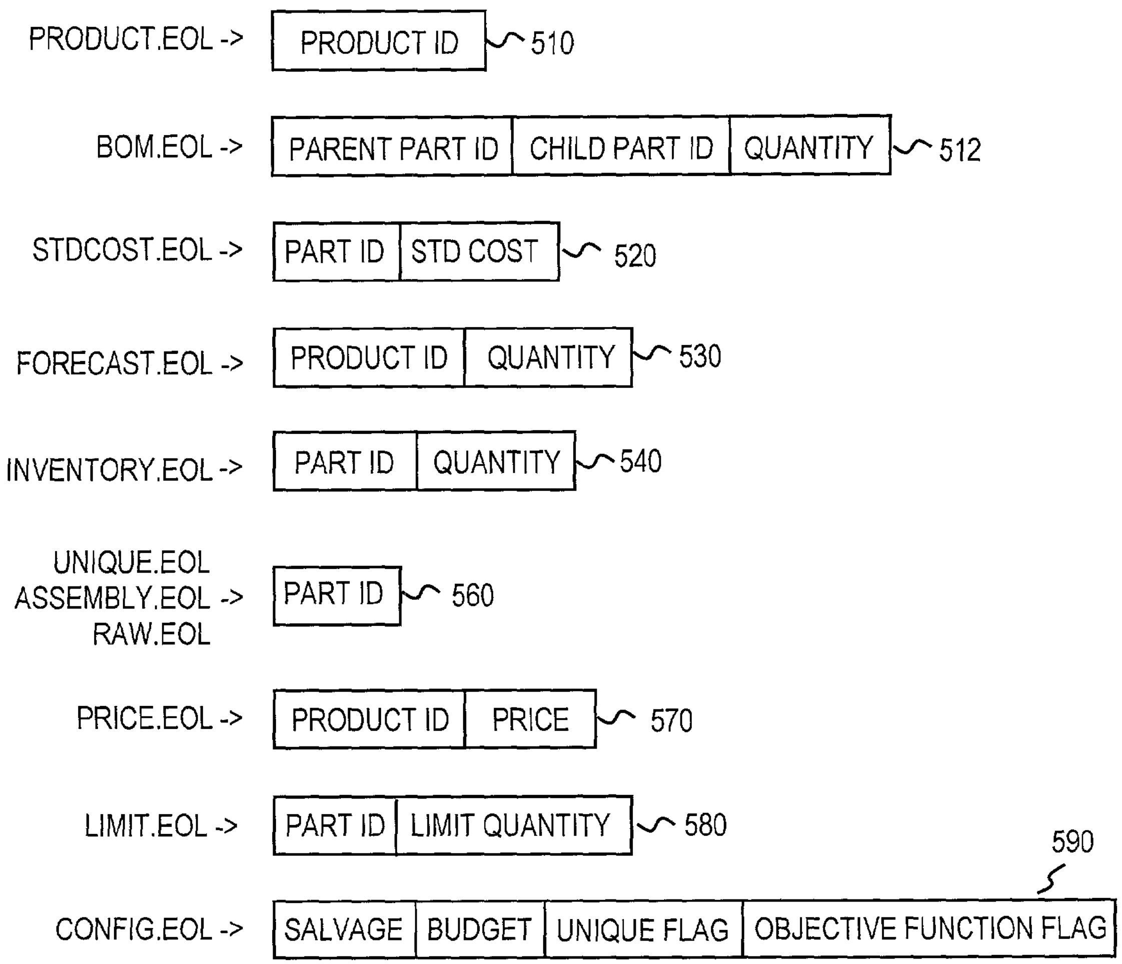
FIG. 5 illustrates one embodiment of record layouts for the data checker output\EOL engine input files.
Figure 6:
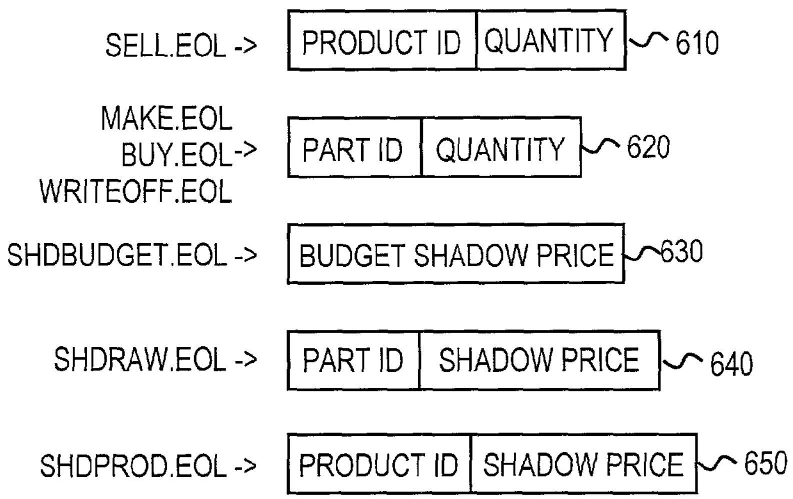
FIG. 6 illustrates one embodiment of record layouts for the EOL engine output files.

FIGS. 4-5 illustrate sample record layouts for data checker 220 input/output files. FIG. 6 illustrates sample record layouts for EOL engine output files.

Referring to FIGS. 3-5, the PRODUCT.TXT file is used to generate the PRODUCT.EOL file that identifies products to be phased out. In one record embodiment 410, PRODUCT.TXT includes a site identifier and product identifier for each product being phased out. Each record 510 of PRODUCT.EOL only includes the product identifier.

The BOM.TXT file defines the bill of materials for each product. A sample record layout 412 identifies a site, a parent part identifier, a child part identifier, and a quantity. A parent part identifier without a child part identifier indicates that the part is an elemental part or a raw material. Data checker 220 generates BOM.EOL (record layout 512), ASSEMBLY.EOL (record layout 560), and RAW.EOL (record layout 560) from the BOM.TXT file. ASSEMBLY.EOL identifies parts that are composed of other parts (e.g., not raw materials). RAW.EOL identifies raw material parts.

The standard cost for each part is defined in STDCOST.TXT and the corresponding STDCOST.EOL (record layouts 420, 520). Validity of the assigned standard costs is verified by ensuring that the standard cost for each part is greater than or equal to the sum of the costs of its constituent (i.e., children) parts.

FORECAST.TXT (and FORECAST.EOL) provides information regarding estimated demand for the products being phased out (record layouts 430, 530). In one embodiment, the EOL engine 240 is a single period engine. Thus multiple period records defined in FORECAST.TXT are rolled into single period records for FORECAST.EOL.

An INVENTORY.EOL file (record layout 540) is compiled from various inventory-related files including INVENTORY.TXT (record layout 440), OPENPO.TXT (record layout 440), RESELLER.TXT (record layout 450), CMINVT.TXT (record layout 440), and CMOPENPO.TXT (record layout 440).

INVENTORY.TXT includes the available inventory, in process inventory, and in transit inventory. OPENPO.TXT lists the parts and any remaining quantities to be received. CMINVT.TXT and CMOPENPO.TXT are optional files that identifies inventories or open purchase order inventory for contract manufacturers. RESELLER.TXT indicates reseller inventory. The reference date field is provided as an indication of the age of the information, but is otherwise not needed by the EOL engine.

The UNIQUE.TXT (and UNIQUE.EOL) file identifies unique parts (record layouts 460, 560). Unique parts generally cannot be easily disposed of if they remain in inventory. For example, in a multi-product manufacturing environment, some unused parts may be used for products that are not being discontinued. Unique parts, on the other hand, may have use only in the product(s) being discontinued. In one embodiment, the EOL management apparatus treats all parts as if they are unique for purposes of meeting the selected objective goal (i.e., Unique Parts=Parts). In an alternative embodiment, the EOL management apparatus ignores the value of non-unique parts for purposes of meeting the objective goals (i.e., Unique Parts $\subset$ Parts).

PRICE.TXT (and PRICE.EOL) indicate anticipated selling price for each product (record layouts 470, 570). In one embodiment, the EOL management apparatus is a single period tool. Thus forecasts or prices are rolled up into a single period.

LIMIT.TXT identifies various limits such as limits on raw materials (i.e., elemental parts, see record layouts 480, 580). CONFIG.TXT (record layout 490) is provided to specify configuration parameters that vary operation of the EOL engine. The corresponding EOL input file is CONFIG.EOL (record layout 590). "Salvage" indicates a generalized salvage value. Typically, the value ranges between 0 and 1 and represents a percentage of the cost of the part. "Budget" is an upper limit on the procurement budget for acquiring additional parts. "Unique Flag" indicates whether some of the objective function calculations consider a subset less than all the parts comprising a product. The "Objective Function Flag" controls whether the EOL management tool attempts to maximize gross profit or minimize writeoff costs.

The EOL engine 240 generates output data 250 consistent with the selected objective. In particular, sell, make, and buy data files are generated.

FIG. 6 illustrates exemplary record layouts for the EOL engine output data files. SELL.EOL indicates the number of each product to sell (record layout 610). MAKE.EOL specifies the number of products to build. BUY.EOL specifies parts to be acquired to fulfill the make report. WRITEOFF.EOL specifies the cost of writing off excess parts. Record layout 620 is used for MAKE.EOL, BUY.EOL, and WRITEOFF.EOL.

The shadow price for a resource measures the marginal value of the resource with respect to the objective. The shadow price reflects the rate of change of the evaluated objective as compared to the rate of change for the resource. Thus, for example, SHDBUDGET.EOL (record layout 630) indicates the marginal increase in gross profit or the marginal decrease in inventory writeoff costs that may result from a marginal increase in a procurement budget. Similarly, SHDRAW.EOL (record layout 640) and SHDPROD.EOL (record layout 650) specify shadow prices for raw materials and products. The raw material shadow price indicates the marginal change to the objective function with respect to changes in the upper limit quantity for raw materials. The product shadow price indicates the marginal change in the objective function with respect to changes in the forecast for a product.

Report generator 260 generates a number of reports 262-268 from the EOL engine input 230 and output 250 data files. In one embodiment, report generator 260 provides a metric 262, sell 264, make 266, and buy 268 reports.

FIG. 7 illustrates a number of metrics 700 that may be reported by EOL engine 240. Inventory exposure reflects the loss exposure before optimization with end of life planning. Inventory exposure is defined as follows:

$$\text{Inventory Exposure} = \sum_{i \in \text{Unique Parts}} Cost_i \cdot Inv_i$$

$Cost_i$ is the standard cost of part i. In one embodiment, the standard cost for an assembly is calculated as the sum of the standard costs of its parts. $Inv_i$ is the on-hand and on-order inventory quantity available for part i as defined by the INVENTORY.EOL file.

The writeoff value represents the value to be written off at the end of the life of the discontinued product(s). Writeoff value is defined as follows:

$$\text{Writeoff value} = \sum_{i \in \text{Unique Parts}} Cost_i \cdot WriteOff_i$$

$WriteOff_i$ is the inventory writeoff quantity computed by the EOL engine 240 for part i.

The after/before inventory exposure ratio indicates the reduction in exposure that can be accomplished if the resulting plan is implemented. This is a ratio of the writeoff value after plan implementation and the inventory exposure before plan implementation. The after/before inventory exposure is defined as follows:

$$\text{After/Before Exposure Ratio} = \frac{\sum_{i \in \text{Unique Parts}} Cost_i \cdot WriteOff_i}{\sum_{i \in \text{Unique Parts}} Cost_i \cdot Inv_i}$$

The procurement investment represents the amount of raw materials that must be purchased to support the sell plan and is defined as follows:

$$\text{Procurement cost} = \sum_{i \in \text{UniqueRawMaterials}} Cost_i \cdot BuyQty_i$$

$BuyQty_i$ is the quantity of raw material i (i.e., part i) that must be purchased to support the sell plan. Unique Raw Materials ⊂ Unique Parts and if the unique flag is set such that all parts are treated as unique, then Unique Raw Materials=Raw Materials.

Assuming demand is realized as expected, the revenue that can be generated by executing the sell plan is calculated as follows:

$$\text{Revenue} = \sum_{i \in \text{Products}} Price_i \cdot SellQty_i$$

$Price_i$ is the selling price for product i. $SellQty_i$ is the quantity of product i to be sold.

The budget metric is the maximum dollar amount that may be invested to purchase raw materials to support the sell plan. This pre-determined value is provided by the user.

Potential loss due to inventory exposure reflects the loss expected to be incurred if the sell plan is not implemented and the available inventory is scrapped. This potential loss is calculated as follows:

$$\text{Loss Exposure before optimization} = (1 - \text{Salvage}) \cdot \sum_{i \in \text{Unique Parts}} Cost_i \cdot Inv_i$$

Salvage is a value [0, 1] provided by the user that reflects the percentage recovery of standard cost for scrapped parts.

The writeoff salvage value (i.e., ending inventory value) metric indicates the salvageable value that can be recovered from writeoff inventory assuming the sell plan is implemented. This metric is calculated as follows:

$$WriteOff\ \text{Salvage Value} = \text{Salvage} \cdot \sum_{i \in \text{Unique Parts}} Cost_i \cdot WriteOff_i$$

The objective function flag indicates the selected objective. The user configures the EOL engine 240 to either minimize writeoff costs or maximize gross profit.

If the selected objective is to minimize writeoff costs, then the EOL engine 240 objective is to minimize λ, where λ is defined as follows:

$$\lambda = \left[(1 - \text{Salvage}) \cdot \sum_{i \in \text{Unique Parts}} Cost_i \cdot WriteOff_i\right]$$

Gross profit is defined as follows:

$$\frac{\begin{array}{c}\text{revenue} - \\ \text{inventory exposure} - \\ \text{procurement investment} + \\ \text{writeoff salvage value} + \\ \text{ending inventory value of non-unique parts}\end{array}}{\text{gross profit}}$$

Accordingly, if the selected objective is to maximize gross profits, then the EOL engine 240 objective is to maximize λ, where λ is defined as follows:

$$\lambda = \left[\begin{array}{l} \sum_{i \in Products} \text{Price}_i \cdot SellQty_i - \sum_{i \in Parts} \text{Cost}_i \cdot Inv_i + \sum_{i \in NonUnique\ Parts} \text{Cost}_i \cdot WriteOff_i + \\ \text{Salvage} \cdot \sum_{i \in Unique\ Parts} \text{Cost}_i \cdot WriteOff_i - \sum_{i \in RawMaterials} \text{Cost}_i \cdot BuyQty_i \end{array}\right]$$

The unique flag indicates whether the writeoff cost minimization considers all parts or only selected parts as unique. If only selected parts (identified in UNIQUE.EOL) are treated as unique, the EOL engine 240 effectively assigns no loss value to non-unique parts when pursuing the objective function of minimizing writeoff. Note that the objective function accounts for any non-unique parts which are presumed to have full recovery value.

The number of products metric may be calculated from the number of records in PRODUCTS.EOL. This reflects the number of products being processed for EOL management. Similarly, the number of assemblies and the number of raw materials may be calculated from the number of records in the ASSEMBLY.EOL and RAW.EOL files, respectively.

FIG. 8 illustrates one embodiment of a sell report 800 for discontinued products. The job number is provided for matching a given input data set with the corresponding sell, make, and buy reports. This report may be used by finance and marketing departments to evaluate the feasibility of the generated EOL solution. The sell report identifies the product number 810, sell quantity 820, selling price 830, demand forecast 840, and product shadow price 850, and expected revenue 860.

The product number 810 identifies the product(s) being discontinued. The sell quantity 820 indicates the recommended quantity of the product to be sold in order to meet the selected objective of minimizing writeoff costs or maximizing gross profit. The selling price 830 is the value provided by the user and used by the EOL engine to arrive at the present solution. Given that the EOL engine is designed for single period computations, the sell price may reflect an average of the estimated selling price of the discontinued product over the EOL planning horizon. Forecast 840 reflects the total expected demand for the discontinued products over the EOL planning horizon. Revenue 860 indicates the revenue that might be generated from each discontinued product if the sell plan is implemented and demand is sufficient to realize the sell plan.

The product shadow price 850 reflects the marginal change in the objective function for a corresponding change in the forecast. Generally, if the product shadow price is greater than zero then the EOL engine will recommend a sell quantity to match the forecast. Assume, for example, that the forecast and sell quantity are 325 and the product shadow price is $393. If the forecast is increased to 326, then EOL engine will recommend a sell quantity of 326. The value of the writeoff cost will decrease by $393, if the objective is minimizing writeoff costs. The value of the gross profits will increase by $393, if the objective is maximizing gross profits. The product shadow price generally indicates which products have more inventory exposure. This information can be used to establish discount prices for a "fire" sale of the discontinued product.

FIG. 9 illustrates one embodiment of a make report 900. This report might be analyzed by a manufacturing and finance departments of the manufacturer for feasibility.

The make report indicates the quantity of individual products and the quantity of assemblies for those products to be built in order to meet the suggested product sell quantities. Make report 900 provides for a description 920 for each part 910. In one embodiment, the make report 900 identifies every part needed for every product even if the quantity is zero.

For each assembly a make quantity 930 and standard cost 940 are provided. Existing inventory 950 levels and anticipated writeoff quantity 960 are also provided. Raw materials may be identified with a make quantity of zero for the purpose of informing the planner about exposure inventory, writeoff inventory, and related costs. The writeoff value 970 is calculated by multiplying the writeoff quantity 960 by the standard cost. In one embodiment, the standard cost is rounded to two digits of precision for reporting purposes, but more than two digits of precision may be preserved for calculation. The writeoff loss exposure 980 reflects the economic loss due to unrecovered writeoff value based on the salvage amount (i.e., writeoff loss exposure=(1−salvage)·writeoff value).

FIG. 10 illustrates one embodiment of a buy report 1000. Manufacturer procurement and finance departments might analyze the buy report for feasibility. The buy report identifies the quantity 1030 of each raw material part 1010 that must be purchased or acquired in order to fulfill the recommended product sell quantities.

The report for the described part (1020) includes the standard cost 1040, an acquisition cost 1050 for acquiring the recommended quantity of the part, and a limit constraint 1060. In the illustrated embodiment, limit quantities greater than zero reflect an upper limit on the quantity that may be acquired for the corresponding part. Numbers equal to zero indicate a lack of availability for the part. In one embodiment, a null or blank indicates that no upper limit is imposed on acquisition quantities. Acquisition limits may be imposed, for example, when the EOL planning horizon is within supplier lead times or because there is a part shortage.

The shadow price 1070 indicates a marginal change in the selected objective function for a corresponding change in limit quantity. Thus, either the gross profit will be increased by the shadow price or the writeoff cost will be reduced by the shadow price if the limit is increased by one.

The writeoff quantity 1090 indicates the quantity of that raw material part after EOL planning. Writeoff value 1092 represents the writeoff quantity multiplied by the standard cost for the part. Other metrics of interest for a buy report may include writeoff costs and salvage value. Whether the raw material is treated as unique may also be indicated by the buy report.

The EOL engine 240 may be implemented as a processor executing standard linear programming libraries (e.g., simplex, interior point, etc. algorithms) for optimizing the selected objective with the constraints (e.g., product, assembly, raw material balance equations, demand forecast, etc.) set forth in the EOL engine input files. Nonlinear approaches such as meta-heuristics may be appropriate in the event of nonlinear constraints or objective functions such as minimizing the variability of gross profit.

When more than one product is considered for EOL planning, the EOL engine determines the optimal product mix to sell and make, optimal assemblies to make, optimal raw material to procure, and optimal inventory to writeoff as measured by the selected objective.

Due to the inherent uncertainty in demand forecasting, one embodiment utilizes a two stage stochastic programming model to hedge procurement investments against demand uncertainty. Procurement investments are made in stage one. Demand realization triggers final assembly and sales corresponding to the second stage make and sell decisions. This multi-stage approach reflects the reality that purchase decisions frequently must be made well in advance of realization of the demand. Raw materials, for example, might take several weeks or months lead time for acquisition while assembly might take a few hours.

Figure 11:
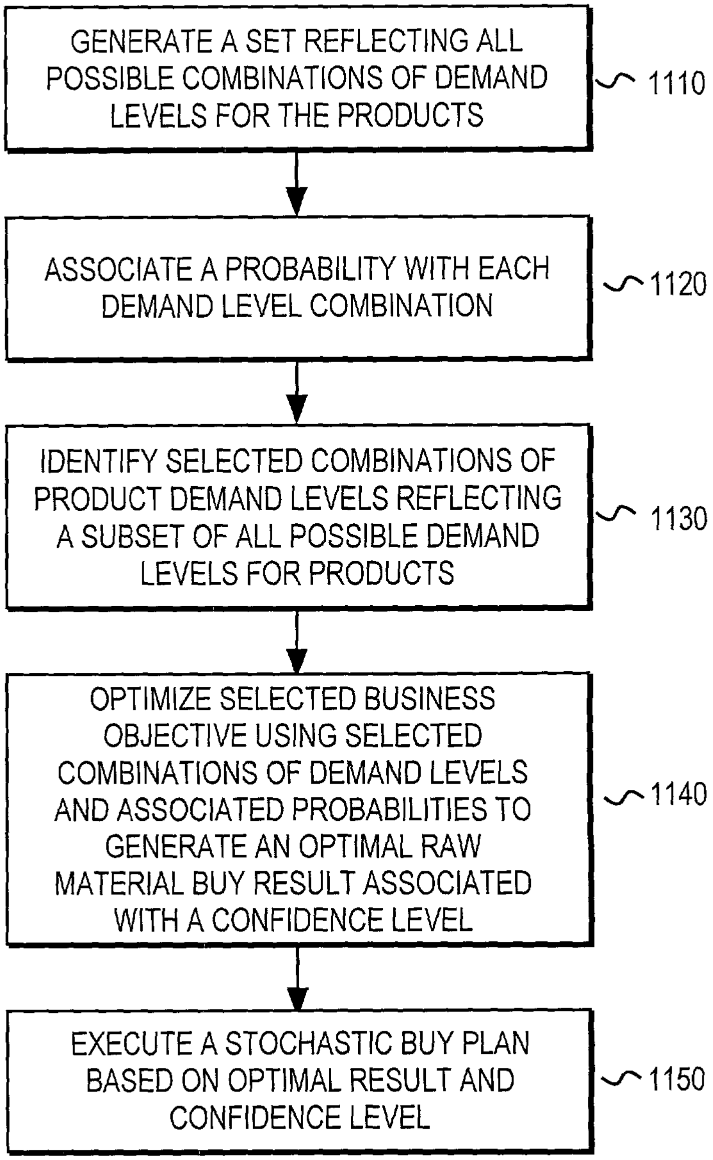
FIG. 11 illustrates one embodiment of a method for generating a stochastic buy plan.

FIG. 11 illustrates one embodiment of a method of optimizing product mix with stochastic demand forecasting. The demand probability density for each product may be modeled with a plurality of demand levels. Each product, for example, might have a high (H), a low (L), and a mean (M) forecasted demand level. A set (A) of all possible combinations of demand levels is generated for the products in step 1110. Three demand levels for each of 14 products, for example, would result in $3^{14}$ (4,782,969) possible demand level combinations (i.e., scenarios).

In step 1120 a probability is associated with each demand level combination. This probability reflects the likelihood that the associated scenario or combination will be realized. Standard statistical methods can be used generate the scenarios and associated probabilities. For example, mean, standard deviation, and covariance of the demands can be estimated from the sales history of the same or related products. This information can be applied to a normalized discrete probability density function. The probability of a particular scenario can be determined from a known probability of a corresponding event in the normalized distribution.

Step 1130 identifies selected combinations or samplings of product demand levels. These selected combinations reflect a subset (B) of all possible demand level combinations (i.e., $B \subset A$). In one embodiment, the selected combinations are placed in a file SCENARIOS.EOL which serves as a replacement for FORECAST.EOL. The sum of the probabilities of all the scenarios is one. Incorporating all possible scenarios into a single linear programming model would require tremendous computational resources due to the large number of variables and balance equations.

In step 1140, the selected business objective is optimized using the selected subset (B) of product demand level combinations rather than the entire set (A) of product demand level combinations. Optimization of the selected business objective using the selected combinations of demand levels and associated probabilities will produce a result including an optimal raw material buy plan associated with a confidence level. The confidence level is indicative of how close the solution obtained using a subset of the scenarios is to the true optimal solution that could be determined if all possible combinations had been included in the analysis.

The user may then execute a stochastic buy plan based on the optimal buy plan and the confidence intervals in step 1150. In particular, in view of the confidence levels associated with buy results for particular parts, the user may choose to buy the raw materials in the quantities suggested or to modify the purchase quantities in view of the confidence interval.

Figure 12:
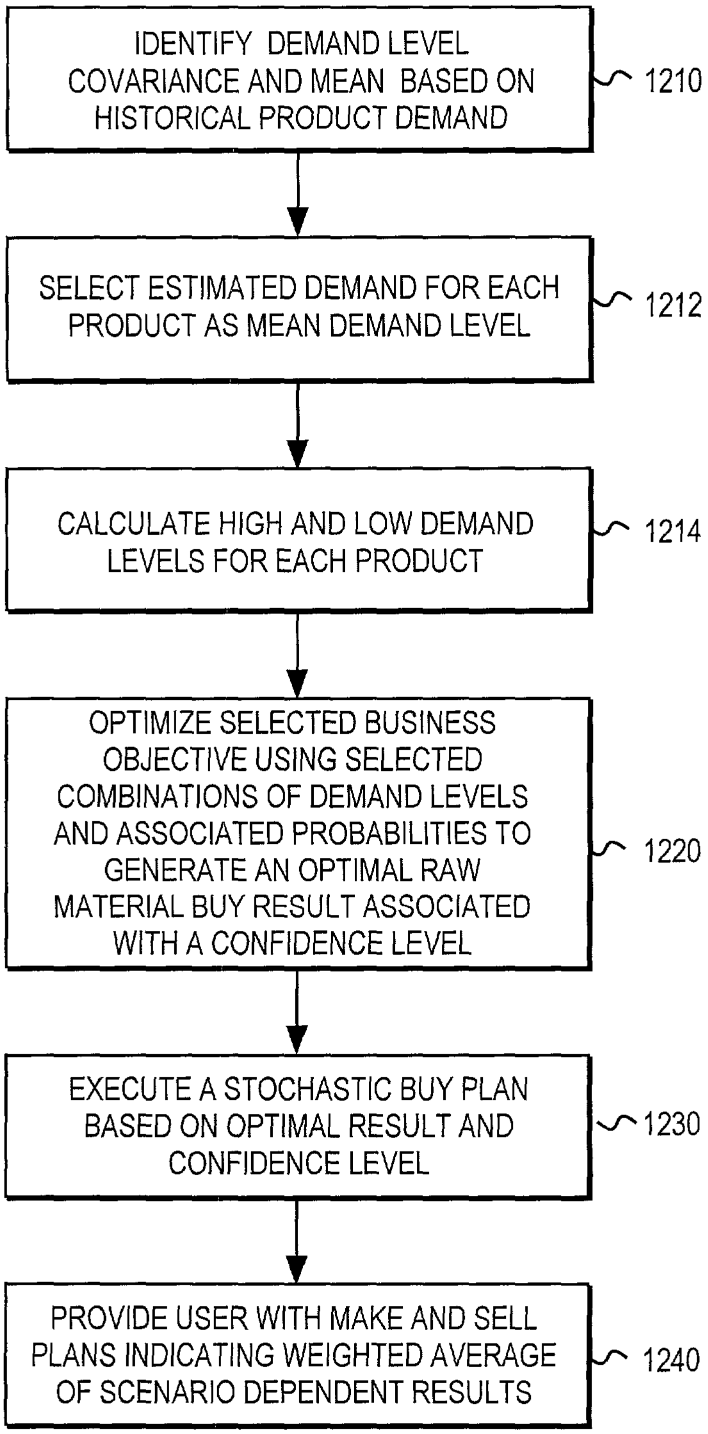
FIG. 12 illustrates one embodiment of a method for generating a stochastic buy plan.

FIG. 12 illustrates one embodiment of a method for generating a optimal buy plan based on a sampling of all possible demand level combinations.

In step 1210, a demand level covariance and mean based on historical product information is determined. These values may be derived, for example, from historical sales data about each product or similar products. This information is used to calculate a plurality of demand levels for each product. In particular, the estimated mean is treated as the expected or mean (M) demand level in step 1212. In step 1214, high (H) and low (L) demand levels are calculated for each product. The high and low levels may be defined as a function of the mean and variance. In one embodiment, the high level is determined by multiplying a product's standard deviation by a factor and adding the result to the mean for that product. Similarly, a low level is determined by multiplying the standard deviation by a factor and subtracting the result from the mean. Steps 1210-1214 produces a plurality n of demand levels for each of the m products. Thus there are $n^m$ possible demand level combinations or scenarios. Each demand level is associated with a probability.

In step 1220 the selected business objective is optimized using a selected subset of the demand levels and associated probabilities to produce an optimal raw material buy result associated with a confidence level. For 4 products and 3 possible demand levels there are $3^4$ possible combinations of demand levels. Members of the selected subset of combinations might include {H, M, L, L} and {M, H, M, L}, for example, but not all possible combinations are present in the selected subset. In one embodiment, Monte Carlo simulation is the statistical tool used to identify the sample subset and a confidence level for the result. Other tools such as Importance Sampling may be used in other embodiments.

The user may then execute a stochastic buy plan based on the optimal buy plan and the confidence intervals in step 1230. In particular, in view of the confidence levels associated with buy results for particular parts, the user may choose to buy the raw materials in the quantities suggested or to modify the purchase quantities in view of the confidence interval.

Although an optimal buy plan is generated, the make and sell quantities will not be known until the demand is realized. This corresponds to the make and sell plans associated with a particular scenario. In one embodiment, the make and sell report initially generated reflects a weighted average of the values determined from each scenario.

Thus, for example, in the deterministic model the variable "$BuildQty_i$" might reflect the quantity to be built for part i. The stochastic model, however, is effectively an array of values $BuildQty_i[k]$ where i is a given assembly or product, where k varies from 1 to n and n reflects the number of samples. Similarly, a sell variable in the stochastic model would be an array of values $SellQty_i[k]$ where i represents a particular product and $SellQty_i[1]$, for example, would reflect the quantity of product i to be sold if the first scenario is realized. For planning purposes, the make and sell reports are modified slightly to provided weighted averages for scenario dependent values. Thus $BuildQty_i$ and $SellQty_i$ in the stochastic model are calculated as follows:

$$BuildQty_i \equiv \sum_{j=1ton} \frac{p_j BuildQty_i[j]}{n}$$

$$SellQty_i \equiv \sum_{j=1ton} \frac{p_j SellQty_i[j]}{n}$$

where $p_j$ is the probability associated with scenario j, and n is the total number of scenarios in the selected combination of demand level combinations (i.e., count of sampled scenarios).

In step 1240, the user is provided with make and sell plans indicating weighted averages of scenario dependent results. Thus in one embodiment, the user is provided with make and sell reports wherein BuildQty for each assembly and product and SellQty for each product are defined as weighted averages based on the probabilities of each scenario.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising one or more processors for executing software instructions for managing discontinuation of a product, the software instructions when executed by the one or more processors performing steps comprising:

a) identifying a product that currently is being manufactured, wherein the product comprises a plurality of parts;

b) identifying an objective to be achieved in connection with the product;

c) obtaining information regarding the parts of said product, said information including: (i) an existing inventory quantity for at least one of the parts and (ii) at least one of a salvage value and a procurement cost for at least one of the parts; and d) generating a plan for at least one of manufacturing the product or procuring additional quantities of the parts, based on the identified objective and the obtained parts information, wherein the identified objective includes discontinuing the product in a manner that at least one of maximizes gross profit or minimizes writeoff costs.

2. The apparatus of claim 1 wherein the identified objective includes discontinuing the product within a period of time that is less than two years.

3. The apparatus of claim 1, wherein the steps also include obtaining an estimate of demand for the product, and wherein the plan generated in step d) also is based on said estimate.

4. The apparatus of claim 1, wherein step a) comprises obtaining information regarding a plurality of products having at least one common part, wherein the information is obtained in step c) for each of the products, and wherein the plan generated in step d) at least approximately achieves the identified objective across all of said products.

5. The apparatus of claim 1, wherein the steps also include inputting a user-specified constraint, comprising at least one of a maximum procurement budget for the parts or a maximum quantity for at least one of the parts, and wherein the identified objective is at least approximately achieved in step d) subject to the input constraint.

6. The apparatus of claim 1, wherein the plan generated in step d) includes a plurality of values, and wherein the steps also include calculating and outputting a measure of how at least one of said values would change based upon a marginal change in an input parameter.

7. The apparatus of claim 6, wherein the input parameter comprises at least one of: a maximum procurement budget or a maximum quantity for at least one of the parts.

8. A computer-implemented method for managing discontinuation of a product, said method comprising:

a) identifying a product that currently is being manufactured, wherein the product comprises a plurality of parts;

b) identifying an objective to be achieved in connection with the product;

c) obtaining information regarding the parts of said product, said information including: (i) an existing inventory quantity for at least one of the parts and (ii) at least one of a salvage value and a procurement cost for at least one of the parts; and d) generating a plan for at least one of manufacturing the product or procuring additional quantities of the parts, based on the identified objective and the obtained parts information, wherein the identified objective includes discontinuing the product in a manner that at least one of maximizes gross profit or minimizes writeoff costs.

9. The method of claim 8 wherein the identified objective includes discontinuing the product within a period of time that is less than two years.

10. The method of claim 8, wherein the method further comprises obtaining an estimate of demand for the product, and wherein the plan generated in step d) also is based on said estimate.

11. The method of claim 8, wherein step a) comprises obtaining information regarding a plurality of products having at least one common part, wherein the information is obtained in step c) for each of the products, and wherein the plan generated in step d) at least approximately achieves the identified objective across all of said products.

12. The method of claim 8, wherein the method further comprises inputting a user-specified constraint, comprising at least one of a maximum procurement budget for the parts or a maximum quantity for at least one of the parts, and wherein the identified objective is at least approximately achieved in step d) subject to the input constraint.

13. The method of claim 8, wherein the plan generated in step d) includes a plurality of values, and wherein the process steps also include a step of calculating and outputting a measure of how at least one of said values would change based upon a marginal change in an input parameter.

14. The method of claim 13, wherein the input parameter comprises at least one of: a maximum procurement budget or a maximum quantity for at least one of the parts.

15. An apparatus for managing discontinuation of a product, comprising:

a) means for identifying a product that currently is being manufactured, wherein the product comprises a plurality of parts;

b) means for identifying an objective to be achieved in connection with the product;

c) means for obtaining information regarding the parts of said product, said information including: (i) an existing inventory quantity for at least one of the parts and (ii) at least one of a salvage value and a procurement cost for at least one of the parts; and d) means for generating a plan for at least one of manufacturing the product or procuring additional quantities of the parts, based on the identified objective and the obtained parts information, wherein the identified objective includes discontinuing the product in a manner that at least one of maximizes gross profit or minimizes writeoff costs.

16. The apparatus of claim 6, wherein the measure reflects a rate of change of said at least one of said values as compared to a rate of change for the input parameter.

17. The apparatus of claim 6, wherein the input parameter comprises a forecast of demand for the product.

18. The method of claim 13, wherein the measure reflects a rate of change of said at least one of said values as compared to a rate of change for the input parameter.

19. The method of claim 13, wherein the input parameter comprises a forecast of demand for the product.

20. The method of claim 11, wherein the plan is generated in step d) uses a two-stage stochastic programming model in which procurement investments are made in a first stage and assembly decisions are made in a subsequent second stage.

21. The method of claim 11, wherein a statistical simulation tool is used to select a subset of possible combinations of demand levels across the plurality of products, and wherein the plan is generated in step d) using said subset.

* * * * *